Aug. 13, 1968　　　J. P. LOCKE　　　3,397,319
DIFFERENTIAL PRESSURE INDICATOR AND SWITCH
Filed March 31, 1966　　　3 Sheets-Sheet 2

Inventor
John P. Locke
By Mann, Brown & McWilliams
Attys.

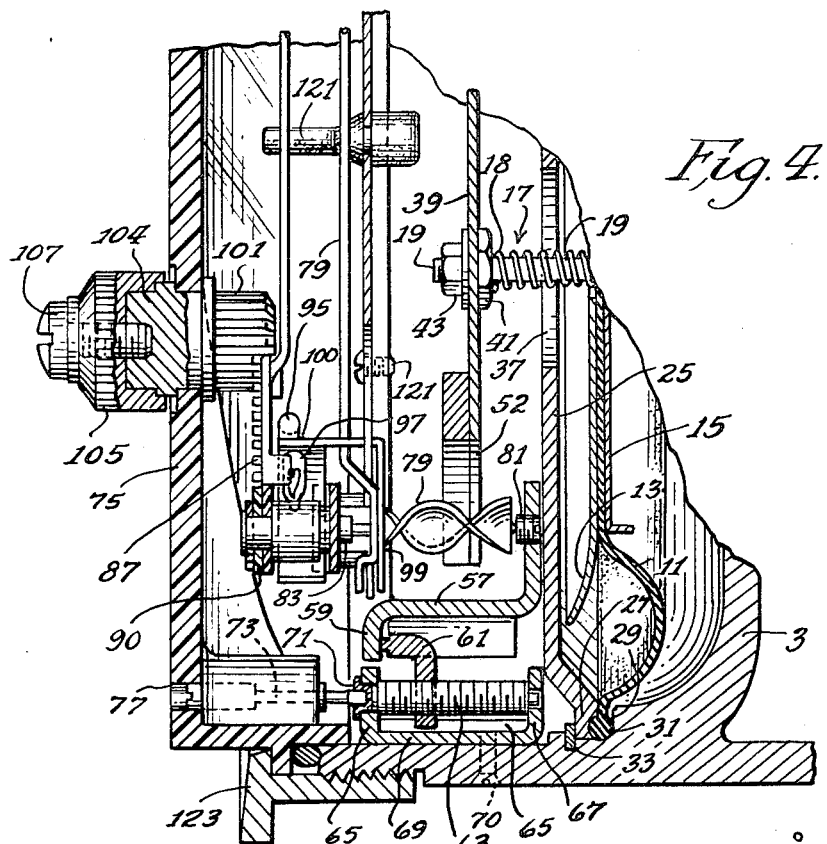
Fig. 4.
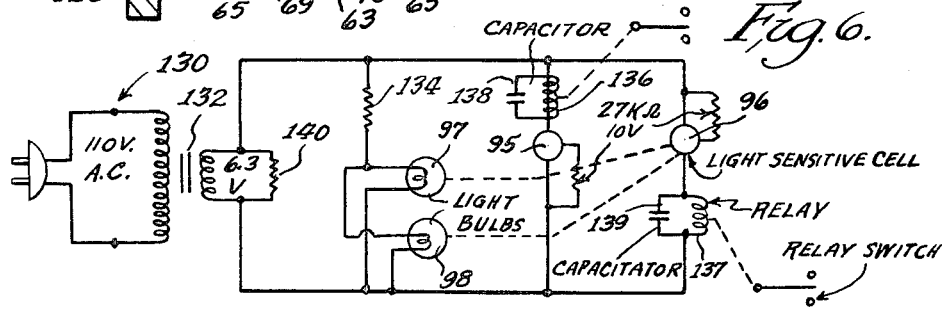
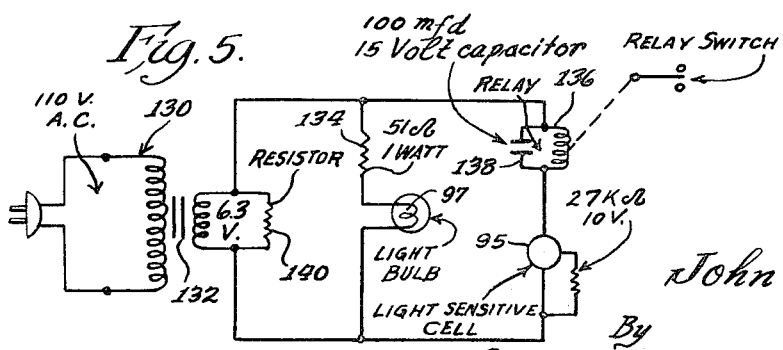
Inventor
John P. Locke.
By
Mann, Brown & McWilliams.
Attys.

United States Patent Office 3,397,319
Patented Aug. 13, 1968

3,397,319
DIFFERENTIAL PRESSURE INDICATOR AND SWITCH
John P. Locke, Michigan City, Ind., assignor to F. W. Dwyer Mfg. Co., a corporation of Illinois
Filed Mar. 31, 1966, Ser. No. 539,151
12 Claims. (Cl. 250—231)

This invention relates to light sensitive electric switches responsive to change in pressure and more particularly to pressure-controlled light sensitive electric switches in which the control element is actuated by a magnetic device which in turn is actuated by change in pressure. The invention also is directed to a combined pressure indicator and switch in which the magnetic device serves the dual function of actuating the pressure indicating means and the switch control element.

Instruments for indicating pressure differential through the mechanism of a magnetizable helical core which is caused to rotate by reason of a permanent magnet mounted on the free end of the cantilever spring actuated by a pressure diaphragm, are known as evidenced by U.S. Patent No. 2,722,837. I have discovered that such instruments can be adapted to act as both pressure indicators and pressure-control switches by mounting a light interrupting element on the helical core in position to interrupt or allow passage of light from a light source to a photosensitive device adjustably mounted so as to permit interruption and passage of light at predetermined pressure differentials. By connecting the photosensitive device into a relay circuit, an electrically actuated switch can be made to open and close at the preselected pressure and thereby control absolute or differential fluid pressure.

It is an object of the invention to provide an automatic pressure-actuated switching device.

It is a further object of the invention to provide a simple light sensitive automatic pressure-actuated switching device.

It is still another object of the invention to provide a combination pressure gauge and switching device.

It is a still further object of the invention to provide a combination pressure gauge and switching device in which the switching mechanism does not affect the operation or accuracy of the pressure gauge.

Still another object of the invention is to provide an adjustable automatic pressure switch which automatically operates at one or more pressure set points.

Other objects of the invention will become manifest from the following description and accompanying drawing of which:

FIG. 4 is a fragmentary sectioned view taken along the line 4—4 of FIG. 3;

FIG. 5 is a diagrammatic illustration of the electric circuit forming part of the switching mechanism adapted to operate a single switch; and FIG. 6 is a diagrammatic showing of another circuit for operating two switches.

Figure 1:
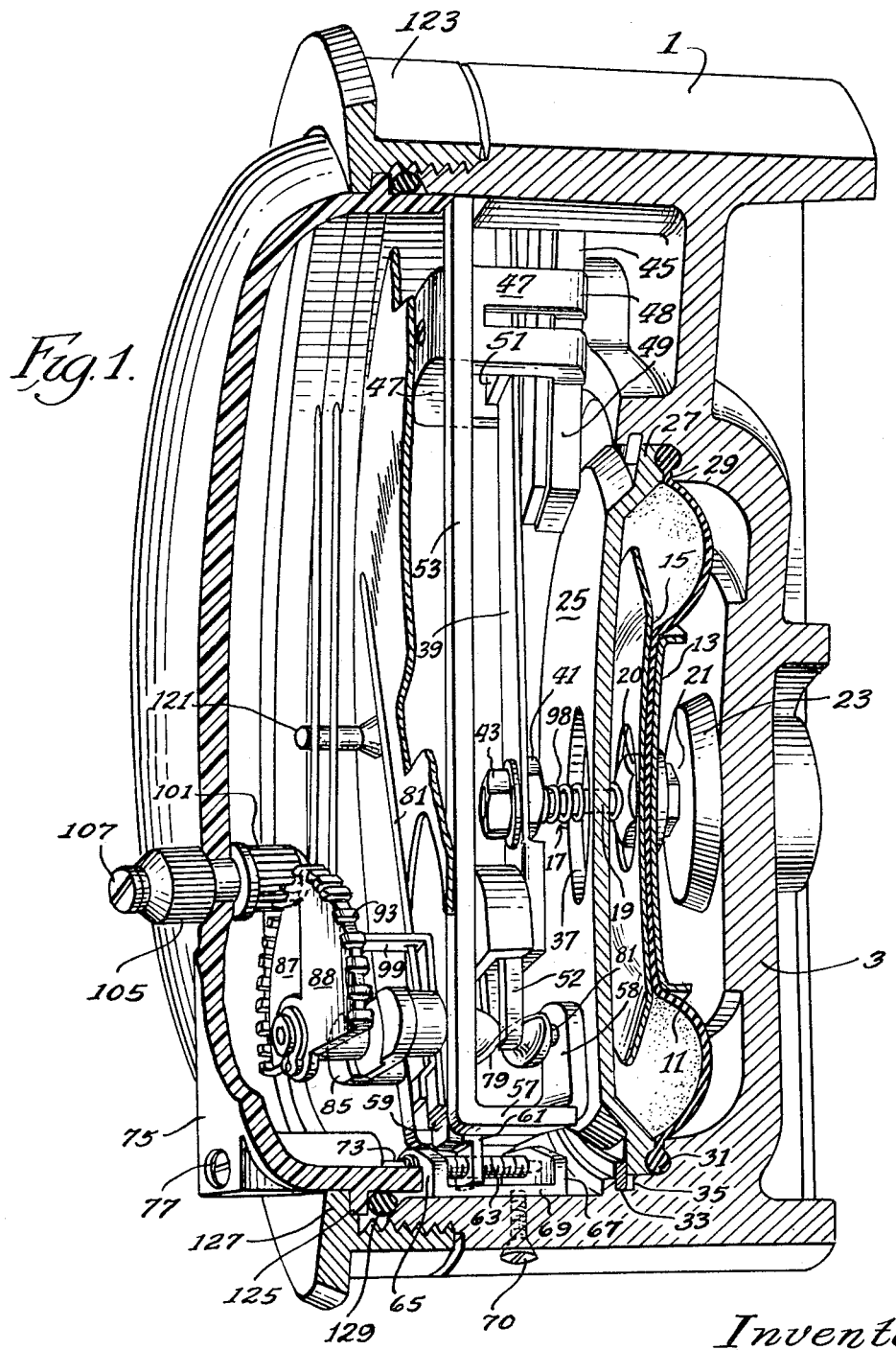
FIG. 1 is a perspective view from a front side angle with portions cut away in order to enable the interior to be seen.

Referring to the drawings and more particularly FIGS. 1 and 4, the numeral 1 indicates a cylindrical casing made of nonmagnetic metal such as aluminum or of plastic. Cast integrally with the casing 1 is saucer-shaped rear wall 3 which forms a stationary wall for low pressure chamber or compartment 5. Compartment 5 is closed by means of a molded flexible diaphragm 11, such as silicone rubber, supported on either side by thin metal plates 13 and 15. Diaphragm 11 is fastened between plates 13 and 15 at its center to connecting link 17 comprising a calibrated spring 18 and threaded terminals 19, in leak-proof relationship therewith by means of nuts 20 and 21. The inner surface of wall 3 is formed with a circular shaped boss 23 centrally of the diaphragm in order to limit movement of connecting link 17.

A saucer-shaped plate 25, inverted with respect to wall 3, is mounted on the side of the diaphragm opposite to wall 3. Plate 25 is formed with flange 27. The edge of diaphragm 11 is held between flange 27 and flange 29 formed on wall 3. An O ring seal 31 is held in a groove between the two flanges. Plate 25 is held tightly against the edge of diaphragm 11 and O seal ring 31 by means of split retaining ring 33 which fits in circular recess 35 in the inner wall of casing 1.

Plate 25 is formed with circular opening 37 centrally thereof in order to allow connecting link 17 to pass therethrough. The upper end of connecting link terminal 19 is fastened to a calibrated flat leaf spring 39 by means of nuts 41 and 43. Spring 39 is preferably made of temperature compensated Ni Span C metal. The small amplitude of motion to which the spring is subjected assures consistency and long life.

Figure 2:
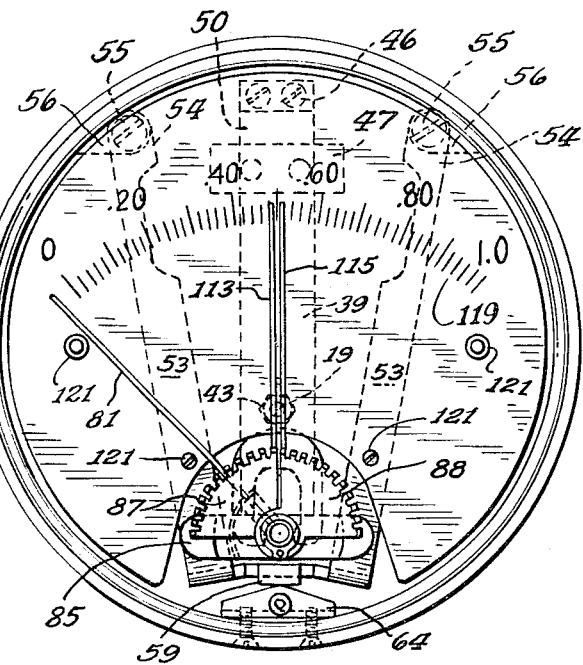
FIG. 2 is a front view of the combined pressure gauge and switch shown in FIG. 1 with the transparent front cover of the casing removed.

One end of spring 39 is rigidly fastened to support 45 by means of screws 46 (FIG. 2). The live length of the spring can be adjusted by U-shaped sliding clamp 47 adapted to slide longitudinally with respect to spring 39. The ends 48 of clamp 47 are turned inwardly and clamp against the underside of rail 49. The clamp is held in place by means of screws 50 (FIG. 2) which bear against plate 51 resting on the spring 39.

On the free end of spring 39 is mounted a horseshoe-shaped permanent magnet 52 made of metal or alloy such as Alnico V, an alloy consisting of 8% aluminum, 14% nickel, 24% cobalt, 3% copper and the balance iron. Other suitable permanent magnetic alloys such as disclosed at p. 2438 of Handbook of Chemistry and Physics, 39th ed. (1957–58), published by Chemical Rubber Publishing Company, may be used.

Figure 3:
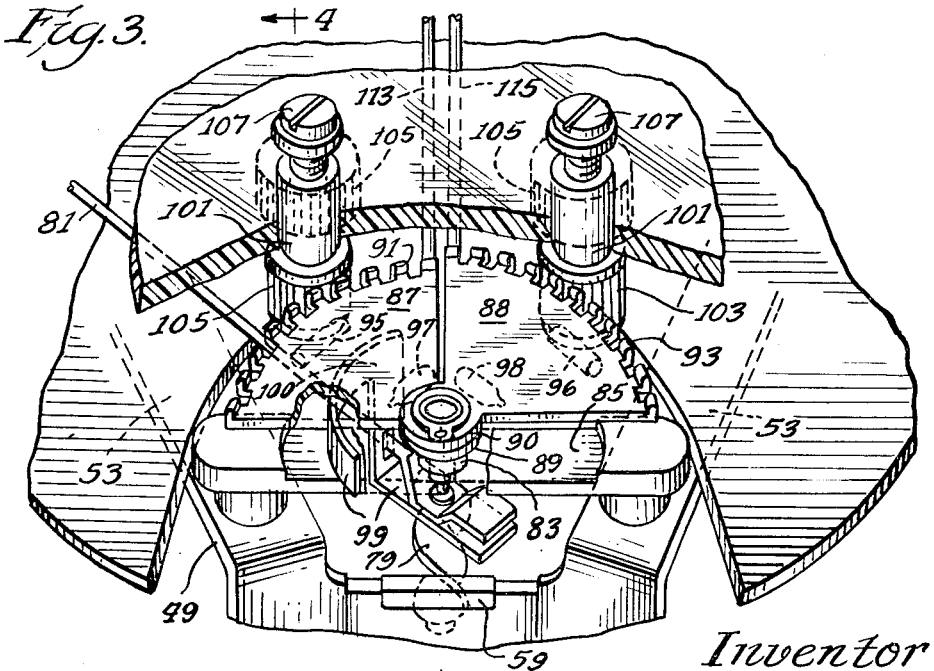
FIG. 3 is a fragmentary front perspective view from a position in a plane cutting perpendicularly through the center of the instrument with parts cut away to more clearly show certain elements of the device shown in FIG. 1.

Referring more particularly to FIGS. 2 and 3, a wishbone assembly 53 is mounted in casing 3 parallel with and in front of spring 39. The ends 54 of the wishbone are screwed fast to the inside of the casing by means of screws 55 screwed into threaded bosses or protuberances 56 cast integrally with the inside wall of the casing. The opposite end of the wishbone is bent to form a U-shaped bracket 57 (FIGS. 1 and 4), the end 58 of which is close to plate 25 but not fastened thereto. Extending outwardly from bracket 57 toward the adjacent casing wall is a lip 59 which is engaged by an L-shaped finger 61 mounted on zero adjust screw 63 held between arms 65 and 67 of bracket 69 mounted on the inside wall of casing 3 by means of two screws 70. Screw 63 is mounted in the two arms of the bracket in a manner to permit it to be rotated but to prevent movement in an axial direction. The outer end 71 of the screw 63 has a square-shaped recess in which the pin 73 having a square sided end, fits. The pin is rotatably mounted in transparent plastic cover 75 in leak-proof relationship therewith and has a screw head 77 available from the outer side of the cover. Finger 61 is mounted on screw 63 and one edge of the finger is adapted to ride in a recess in bracket 69. Upon turning screw head 75, screw 63 is rotated causing finger 61 to move in either direction, depending on the direction of rotation. If it moves toward the cover 75, the finger engages lip 59 and moves the bracket end of wishbone 49 and also the helix mounted thereon, toward cover 75, thereby changing the relation between the helix and magnet 47. The helix will turn until it has assumed a position of minimum space between the helix 79 and the poles of the magnet. In this way the gauge pointer 81 fastened to the outer end of the helix can be set on zero position. Helix 79 is made from metal of high magnetic permeability such as soft iron or other metal disclosed at p. 2437 of Handbook of Chemistry and Physics, 39th ed., 1957–58, published by Chemical Rubber Publishing Company. The helix is supported in jeweled bearings 81 and 83 (FIGS. 3 and 4) mounted in the bracket end 57 of wishbone 49 and on boss 85, respectively. Instead of forming the helix of metal having high magnetic permeability, the helix can be made of a permanent magnetic alloy and instead of forming the magnet 47 of metal having magnetic properties, magnet 47 can be made of soft iron or other metal of high magnetic permeability. Casing 1 is provided with threaded ports (not shown), one for communicating the low pressure compartment 5 with the low pressure side of the gas to be controlled and the other for communicating the high pressure side of diaphragm 11 with the high pressure side of the gas to be controlled.

The instrument so far described functions in substantially the same manner as the pressure gauge described in the patent to Dwyer No. 2,722,837.

Mounted coaxially with helix 79 on boss 85 are two quadrants 87 and 88, the arcuate edges of which are formed with gear teeth 91 and 93. Both quadrants are mounted on the same spindle by means of hubs 89 and 90, respectively, (FIG. 3), one being above the other, but with the adjacent straight sides in non-overlapping position. The quadrants 87 and 88, although mounted coaxially with the helix 83, are mounted on a spindle separated from the helix so that each can be independently rotated. On the under face of each quadrant is mounted a micro light sensitive element 95 and 96, and a micro light 97 and 98. Mounted at one end of the helix 79 by means of L-shaped arm 99 is a light interrupting element or shield 100 in the form of an arcuate strip of light sheet metal such as aluminum. As the helix turns, shield 100 turns with it. Shield 99 is placed in such position with respect to lights 97 and 98, and light sensitive elements 95 and 96, that where the pressure differential on the two sides of the diaphragm exceeds the desired pressure by a predetermined amount, shield 99 will be rotated to a position where it unblocks the pathway between the light 97 and corresponding photosensitive element 95 connected to a high pressure limit relay, but will continue to block the pathway between light element 98 and light sensitive element 96, connected to a low pressure limit relay. On the other hand, if the pressure differential falls below a predetermined amount, shield 99 will rotate in the opposite direction together with the helix and unblock the pathway between light 98 and light sensitive element 96 while continuing to block the pathway from light 97 to element 95. In normal operating position, shield 99 blocks both pathways. As light sensitive elements 95 and 96 I may use any element which is triggered by light to conduct electricity and which will conduct when it is not exposed to light, such as the silicon PNPN photocell sold by South State Products, Inc. of Salem, Mass., under the name Micro Photran. The photocell can be operated from either A.C. or D.C. current. When A.C. current is used, the photocell will block during the positive half cycle when it has not been triggered by light and will conduct when it has been triggered by light. During the negative half cycle the photocell acts as a blocking diode regardless of whether light is on it or not. If the device has been conducting during a positive half cycle, it will automatically drop out of conduction during the negative half cycle and must be retriggered with light before it will again conduct on another positive half cycle. When used in conjunction with A.C. current it is possible to directly operate solenoid switches without auxiliary equipment.

Mounted on the front plastic cover 75 are gears 101 and 103 which mesh with the gears of quadrants 87 and 88 respectively. The gears are mounted on leak-proof rotatable bushings 104 fitted in holes in the cover. A knurled knob 105 is fastened on the outside of the bushing by means of screws 107. Quadrants 87 and 89 can be individually adjusted by means of knobs 105 to a selected position so that the light sources 97 and 98 will energize the respective light sensitive cells at predetermined high and low pressure differentials.

Extending from the adjacent edge of each quadrant is a pointer 113 and 115 which indicates a pressure for which the quadrant had been set. Face plate 117 bearing suitable pressure indicia 119 is mounted on the front of wishbone 49 by means of screws 121. The indicia may be in terms of inches of water.

The face of the casing 1 is closed by means of bezel 123 having threads which cooperate with threads on the outer face of casing 1. The transparent plastic cover 75 has a flange 125 which fits under a cooperating flange 127 of the bezel. Between the flange 125 and the upper edge of casing 1 is a sealing O ring 129 which maintains the inside of the casing leakproof when bezel 123 is screwed tightly onto the casing.

Referring now to FIGS. 5 and 6, there are shown the electric circuits in which the light sources and the light sensitive elements are connected. FIG. 5 shows the circuit in which only one switch device is incorporated. In this case only a single quadrant will be required with a single light source and light sensitive element. The number 130 represents a source of A.C. current which may be 60 cycle, 110 volt house current. 132 is a transformer to transform the voltage down to approximately 6.3 volts which is suitable for operating the micro lamp. By using low voltage the lamp can be made to last as long as 200,000 hours at 5 volts and in excess of 50 years at 4 volts. Referring more particularly to FIG. 5, light bulb 97 is connected to the secondary of the transformer in series with resistance 134 in order to enable the amount of light coming from the bulb to be reduced and thereby increase its life span. Connected in parallel with the light bulb 97 is relay 136. A capacitor 138 is connected across relay 136 in order to reduce chatter. Light sensitive element 95 is connected in series with relay 136. A resistor 140 is connected across the secondary of transformer 132 to reduce extraneous surge voltages that might be injurious to the photocell. It will be apparent that the only current required to operate the switching device is that necessary to light bulb 97 and operate relay switch 136.

FIG. 6 shows a circuit used when the instrument is equipped with two quadrants and two switching devices as shown in the drawing. In this modification the circuit has two light sources 97 and 98 connected in parallel and two light sensitive cells 95 and 96 connected in parallel. Each light sensitive cell 95 and 96 has a relay switch 136 and 137 connected in series therewith respectively, with a capacitor 138 and 139 across each relay. The circuitry shown in FIGS. 5 and 6 is adapted to be placed in a cylindrical casing fastened in any suitable manner to the back end of casing 1. The relays may be included as part of the circuit or the relays may be omitted in the event that the unit is to be connected to outside relays. The casing is equipped with suitable openings (not shown) in order to permit a plug to be inserted from an A.C. source and connect the circuit thereto. A second opening (not shown) is provided to permit the circuit to be connected to valve operating mechanism or to suitable switching devices for operating outside relays.

By using miniaturized parts, it is possible to contain the necessary elements and circuit within a cylindrical casing having a diameter of 4½ inches and a length of 5¾ inches. Where it is desired to control only one unit either on a high or low side, the device will contain only one quadrant. Where it is desirable to control pressure on both the high limit and low limit side two quadrants will be used, one controlling the low limit side and the other controlling the high limit side.

Since the only element carried by the helix other than the pointer, is the light interrupting shield, and since this element is extremely light, it does not interfere with the accuracy of the instrument. The instrument can be adjusted between pressure differential of 0 and 1.0 inch of water. Within the range of the instrument it can be used to operate switches at any desired predetermined high or low pressure differential. The pressure indicator acts independently of the switching mechanism.

The intensity of the light does not effect the operation of the switching mechanism. Since a photocell is a go or no go cell, that is, it conducts when light strikes it and does not conduct when light does not strike it, the system is highly sensitive and accurate.

The instrument is useful in controlling air pressure or pressure of other gases that are not injurious to the parts with which the gases come in contact.

It will be seen, therefore, that I have provided a combined pressure indicator and switching mechanism which are commonly actuated but which can be independently controlled.

Although the invention has been described in connection with pressure control, it is useful for controlling other variables such as temperature where temperature change is used to cause movement of the magnet in the same manner as pressure change and the movement of the magnet then translated into rotary movement of a helix.

I claim:

The embodiments of the invention in which an exclusive property or privilege is claimed are defined as follows:

1. A pressure switch comprising
   (a) pressure sensitive means adapted to move with change in pressure;
   (b) a light interrupting member;
   (c) a light source on one side of said light interrupting member;
   (d) a photosensitive device on the other side of said light interrupting member, said device conducting current when exposed to the light source and being a non-conductor when not exposed to the light source;
   (e) a rotatably mounted magnetized helical core;
   (f) a magnetic armature operatively mounted with relation to said core, said armature being mounted at the free end of a cantilever spring which is rigidly mounted at its other end;
   (g) said spring being operatively connected to said pressure sensitive means in such manner as to cause the free end thereof and the armature mounted thereon to move in unison with said pressure sensitive means;
   (h) said interrupting member being mounted to rotate in unison with said helical core and being sized and positioned so as to move into and out of the straight line path between said light source and photosensitive device upon predetermined positions of said armature;
   (i) means for connecting said light source to a source of electric potential;
   (j) means for connecting said photosensitive device to a source of electric potential; and
   (k) means for connecting said photosensitive device in series with a relay.

2. A pressure switch in accordance with claim 1 including
   (1) a second photosensitive device and a second light source each connected in parallel with the first mentioned photosensitive device and light source, respectively;
   (m) said light interrupting member being sized and positioned to interrupt light from both light sources in certain predetermined positions of said armature and to expose one but not both photosensitive devices to its respective light source in certain other predetermined positions of said armature;
   (n) means for connecting said second light source to a source of electric potential; and
   (o) means for connecting said second photosensitive device to a source of electrical potential, in series with a second relay.

3. A pressure switch in accordance with claim 1
   (1) in which at least one of said photosensitive device and said light source are rotatably mounted on an axis coincident with the axis of the helical core but independently of said helical core; and which
   (m) includes means for manually rotating at least one of said photosensitive device and light source to different positions.

4. A pressure switch in accordance with claim 3 in which the photosensitive device and light source
   (n) are mounted on a segment, the outer edge of which is arcuate and formed with gear teeth, and
   (o) the means for manually rotating said photosensitive device and light source includes a rotatably mounted gear wheel meshing with the gear teeth of said segment.

5. A pressure switch in accordance with claim 1 including
   (1) means for changing the position of the straight line light path from such light source to its cooperating photosensitive element.

6. A pressure switch in accordance with claim 2 including
   (p) means for independently changing the position of each straight line path from a light source to its cooperating photosensitive element.

7. A pressure switch in accordance with claim 2 including
   (p) means for mounting each light source and cooperating photosensitive device on a separate segment independently rotatable about an axis coincident with the axis of the helical core.

8. A pressure switch in accordance with claim 7 including
   (q) gear teeth on an arcuate edge of each segment; and
   (r) means to rotate said segments, including a gear wheel meshing with the gear teeth of each segment.

9. A pressure switch in accordance with claim 4 including
   (p) indicator means for indicating the position of said photosensitive device.

10. A pressure sensitive switch in accordance with claim 8 including
    (s) indicating means for indicating the position of said photosensitive devices.

11. A pressure switch in accordance with claim 9 which includes
    (q) indicating means for indicating pressure exerted on said pressure sensitive means; and
    (r) means for adjusting said indicating means.

12. A pressure switch in accordance with claim 10 including
    (t) means for indicating pressure exerted on said pressure sensitive means; and
    (u) means for adjusting said indicating means.

No references cited.

ROBERT SEGAL, *Primary Examiner.*